United States Patent
Lukiyanets et al.

(10) Patent No.: US 8,245,903 B2
(45) Date of Patent: Aug. 21, 2012

(54) FUSION WELDING METHOD FOR CONNECTING THIN-WALLED CASINGS

(75) Inventors: Sergey V. Lukiyanets, Zlicin (CZ); Nikolay G. Moroz, Mizosov (CZ)

(73) Assignee: Armoterch S.R.O., Prague (CZ)

( * ) Notice: Subject to any disclaimer, the term of this patent is extended or adjusted under 35 U.S.C. 154(b) by 0 days.

(21) Appl. No.: 13/059,326

(22) PCT Filed: Aug. 26, 2009

(86) PCT No.: PCT/EP2009/006185
§ 371 (c)(1),
(2), (4) Date: Mar. 3, 2011

(87) PCT Pub. No.: WO2010/022931
PCT Pub. Date: Mar. 4, 2010

(65) Prior Publication Data
US 2011/0266333 A1    Nov. 3, 2011

(30) Foreign Application Priority Data

Aug. 27, 2008 (RU) ................................. 2008134621
Aug. 27, 2008 (RU) ................................. 2008134622

(51) Int. Cl.
*B23K 1/20* (2006.01)

(52) U.S. Cl. .................. 228/173.4; 228/173.1; 228/200
(58) Field of Classification Search ............... 228/173.1, 228/113, 200, 173.4
See application file for complete search history.

(56) References Cited

U.S. PATENT DOCUMENTS 3,179,781 A   4/1965  Ross
2008/0054050 A1  3/2008  Bruckner

FOREIGN PATENT DOCUMENTS
DE     102005002618 A    12/2005

*Primary Examiner* — Nicholas D'Aniello
(74) *Attorney, Agent, or Firm* — Andrew Wilford

(57) ABSTRACT

Two thin-walled jackets a joined by preparing end faces of the jackets by plastically deforming and upsetting microprojections thereon and thereby forming the metal of the upset microprojections into annular beads on inner surfaces of the respective jackets. Then the end faces are abutted while centering the jackets on each other relative to their external diameters. The end faces are then spot welded together in a plane where the end faces abut and then joined with a continuous main weld having a width equal to between four and six times the thickness of the wall of the jackets. Heat is then extracted from the welded jackets starting at a distance not exceeding times the wall thickness from a joint center line where the end faces abut.

13 Claims, 5 Drawing Sheets

FUSION WELDING METHOD FOR CONNECTING THIN-WALLED CASINGS

CROSS REFERENCE TO RELATED APPLICATIONS

This application is the US-national stage of PCT application PCT/EP2009/006185, filed 26 Aug. 2009, published 4 Mar. 2010 as WO2010/022931, and claiming the priority of Russian patent application 2008134622 itself filed 27 Aug. 2008 and Russian patent application 2008134621 itself filed 27 Aug. 2008, whose entire disclosures are herewith incorporated by reference.

FIELD OF THE INVENTION

The invention relates to welded products, in particular to the technological field of full fusion welding in a medium of inert gases with the addition of halogen reagents in the welding zone, and may be used in welding in particular thin-walled jackets, tube blanks and the like of stainless steels.

PRIOR ART

To carry out welding of particularly thin-walled cylindrical products with large circumferential lengths, the joint edges of the products must be completely congruent with regard both to thickness and to circumference, taking account of concentricity and centering precision of the parts to be welded.

When welding particularly thin-walled products it is moreover not possible to effect high quality fusion welding of joint end faces without special preparation of the parts on the basis of the commensurability of the roughness parameters and the parameters of the difference in thicknesses of the joint end faces with their thickness. The reason for this is that, when performing full fusion welding, as a result of the random nature of the formation of the contact points at the joint end faces under the action of the welding current flowing at the contact points rapid overheating of the metal the contact points takes place, together with ejection thereof out of the welding zone. Furthermore, it is not possible, in the light of the specific peculiarities of heating the metal during uninterrupted fusion, to achieve the sufficiently wide heating zone necessary for high quality welding of workpieces of large cross-section. It is known that the preparation quality of the surface layer (roughness, unevenness, wear resistance, microhardness, residual stresses) of the parts has an effect on the quality of the weldability thereof.

It is likewise known that, when performing welding of particularly thin-walled workpieces with large circumferential lengths, a nonuniform change in the circumferences of the blanks to be welded occurs as a result of the thermal stresses which arise in the material of the blanks to be welded when performing the welding process. These changes in the length of the circumferences lead at best to distortion of the blanks to be welded or to melt-through of the blanks to be welded. To achieve high quality performance of the method for welding thin-walled jackets, it is necessary to bring about complete congruence of the joint edges of the workpieces both with regard to thickness and with regard to circumference, taking account of concentricity and centering precision of the parts to be welded, and to maintain this state during the actual welding process.

A method is known from SU 1185781 A1 for preparing and assembling annular joints, substantially of flexible structures, for welding, including machining of edges to a previously determined size and fitting thereof on a centering expansion ring, wherein first of all each of the parts to be welded is arranged on the centering ring, the ring is expanded, the weld edges are elastically deformed and machining thereof is performed and then assembly of the joints takes place, for which the rings are placed one above the other along the surfaces to be joined together axially.

The disadvantage of this solution is that, when carrying out the machining on thin-walled parts, end faces arise with a roughness which is commensurable to the thickness of the wall of the parts, which makes high quality welding thereof impossible.

RU 2 288 827 C1 discloses a method for preparing the edges of tubes for welding, with which turning and cold forming of the end face of the tube is effected, wherein at the upper edge thereof a fitted projection is formed and wherein the end face of one of the tubes to be welded faces the cutting tool at an angle of 90° to the axis of the tube and the end face of the second tube is machined from inside with an angle of 90°, wherein in the upper part of the end face an annular projection remains with a thickness and length of no more than 4 mm, wherein this annular projection is then bent outward with a friction roller at an angle of 45 to 90° relative to the axis of the tube and the resultant bent back projection is turned, wherein its cross-section acquires the shape of the fitted projection, namely of an equilateral triangle or equilateral trapezium or of a rectangle, whereupon a cylindrical plane with an internal diameter equal to the external diameter of the end face of the first tube is turned in the end face beneath the fitted projection.

The disadvantage of this solution is that it does not allow high quality welding.

The closest prior art to the proposed invention is the solution according to RU 95118844 A. A method is proposed herein which consists in arranging the blank in a matrix on a support and applying upsetting forces to the blank from the end face side by a turning tool, wherein the shaping process allows the constituents of the phase composition of the metal of the blank to be redistributed as far as the crystallographic stage while phenomenologically combining the physical characteristics.

The disadvantages of this solution consist in the fact that, on the application of elevated contact pressures, compression proceeds in a previously determined direction and that material is redistributed which is not removed from the machining zone, which prevents high quality preparation of the thin-walled jacket blanks to be welded.

OBJECT OF THE INVENTION

The object of the invention is to provide a method for high-quality welding of the annular joints of thin-walled cylindrical jackets to produce closed containers.

SUMMARY OF THE INVENTION

This object is achieved by a method where on each of the jackets to be joined, deformation of the microprojections on the surface to be welded of the end face is carried out by plastic deformation by means of upsetting of the material, then the metal to be deformed on the end face is moved to the side of the inner surface of the jacket and an inner annular bead strip is formed thereon. Subsequently the jackets to be joined are arranged in a device effecting centering relative to the external diameter. Then spot welding thereof is performed at the circumference in the plane of the joint, followed by continuous main welding to form a fusion zone whose width amounts to between $4\delta$ and $6\delta$, $\delta$ being the thickness in mm of the wall of the jacket to be welded. Finally heat is removed in the parts to be welded starting at a distance which does not exceed 8δ from the joint center line.

With the method according to the invention it is possible to enhance the quality of a weld seam in thin-walled jacket blanks by creating a dense, fine-grained structure without microdefects, which improves the quality of the weld seam.

In a preferred embodiment of the method according to the invention for full fusion welding of thin-walled, substantially flexible cylindrical jackets, the end faces to be joined together are prepared, an abutting arrangement is brought about using centering devices and common fusion is performed with temporary maintenance of an alignment gap sufficient for performing welding between the adjacent surfaces, wherein deformation of the microprojections takes place by plastic deformation on the surface to be welded of the end face on each of the jackets to be joined together, wherein upsetting of the magnitude $\Delta h = a\delta + b\ \delta^2/R$ takes place with rollers with a roughness parameter $Ra \leq 0.16$ μm, wherein δ is the thickness of the wall of the jacket to be welded in mm;

R is the radius of the jacket to be welded in mm;

a, b are the constant coefficients for the range δ/R of 0.003 to 0.01, which accordingly form the values which lie between 0.1 and 0.3 for a and between 0.075 and 0.375 for b;

wherein the deformed metal of the end face of the hollow cylindrical blank is moved toward its inner surface side and an inner annular bead strip is formed thereon with a width of from 0.5δ to 1.5δ and a thickness of from 0.2δ to 0.5δ, the jackets to be joined together are arranged in the device effecting centering relative to the external diameter, and first of all spot welding thereof takes place at the circumference in the plane of the joint, wherein the electrode is moved in steps by a step of 20δ to 50δ, is wherein the actual continuous main welding proceeds with the formation of a fusion zone, the width of which lies between 4δ and 6δ, wherein the removal of heat from the parts to be welded is begun at a distance which amounts to no more than 6 to 8δ from the joint plane.

Deformation of the microprojections at the end face and upsetting thereof is performed with limitation of the radial deformation of the lateral outer surface, which adjoins the end face.

Deformation of the microprojections at the end face and upsetting thereof is performed with simultaneous smoothing with rollers of the outer, lateral surface adjacent the end face.

Deformation of the microprojections at the surface to be welded of the end face is performed with rollers with a diameter equal to (4-6) δ and with a hardness parameter of the material of HRc>65.

Deformation of the microprojections at the surface to be welded of the end face is performed with a contact force applied to the roller of 200-300 N.

Spot welding is performed in two revolutions, wherein the second revolution is staggered by half a step length from the first welding.

The thin-walled annular strips at the inner surfaces of the jackets to be welded are configured with the same internal diameter for each of the jacket blanks to be welded.

The thin-walled annular strips at the inner surfaces of the jackets to be welded are configured at an angle other than a right angle inside each of the jacket blanks to be welded.

Inert gas media of different compositions are supplied to the heating point of the material at the outer and inner surfaces of the jackets to be welded.

After plastic deformation and prior to welding, the end face surfaces of the blanks are cleaned with a solvent.

The advantage of the invention lies in the simplicity and reliability of its implementation.

EMBODIMENTS OF THE INVENTION

As a rule, particularly thin-walled jackets and tube blanks, which are made from sheet-type semifinished products by deformation during the production process, exhibit differences in the linear dimensions of diameter, thickness, machining quality of the end faces etc.

It is known that the microgeometry of a machined surface depends on a large number of different factors, such as for example mode of cutting, defectiveness of the shape, vibrations in the technical system etc. It is therefore regarded as the realization of a random microroughness field and determined by characteristic values such as Rz, Rc and Ra.

Figures 1, 2:
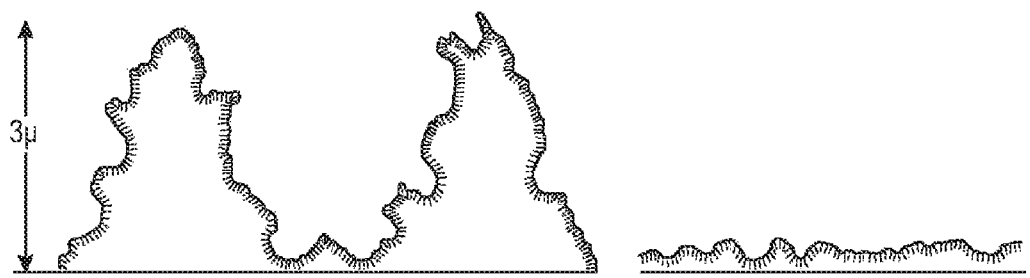
FIGS. 1 and 2 are schematic representations of a method for plastic deformation.

On parts with surface irregularities, adsorption of various gases takes place, which, apart from leading to the above-stated effects, results in considerable problems when welding thin parts. The quantity of adsorbed gases in the case of metals and alloys depends greatly on the degree of roughness of the surface thereof. Thus, in the majority of ultrahigh vacuum chambers in analytical and technological installations, which are produced by many well-known companies, the inner surface is conventionally machined to a roughness grade Ra of 1 to 3 μm. Such a surface looks in cross-section roughly as is shown in FIG. 1.

If it is possible to polish this surface to a roughness grade Ra of 0.1 to 0.3 μm, the true area thereof is reduced by more than a factor of 10. The total number of defects in the structure is substantially smaller, and this surface looks roughly as is shown in FIG. 2.

Achieving high machining quality is possible by machining the surface to be prepared using plastic deformation methods, for example by rolling smooth with a quality parameter of the work surface of $Ra \leq 0.16$ μm and a hardness parameter of the material of HRc>65.

Figure 3:
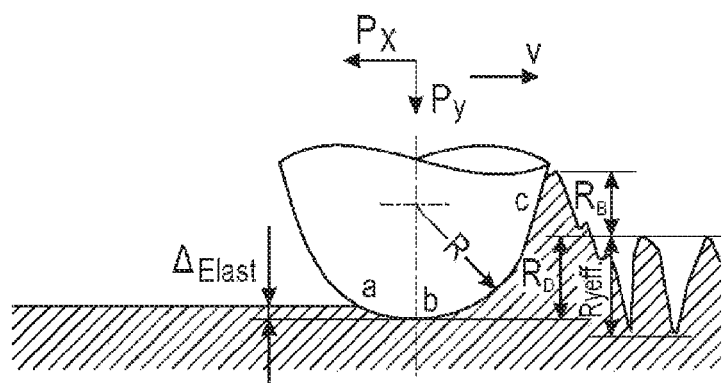
FIG. 3 is a schematic representation of the roughness of the surface of a workpiece.

FIG. 3 shows the deformation of the surface layer on movement of the tool in the smoothing direction plane. The tool, which is pressed with a force $P_y$ against the surface to be machined, is inserted to a depth $R_D$, and smoothes the original roughnesses when moved. After passage of the tool, the surface undergoes partial elastic rebound to a height of $\Delta_{Elast}$.

As a result of the plastic deformation of the surface to be machined, the original roughnesses are smoothed and a new surface microrelief is formed to a substantially lower irregularity height $R_z$. The size of the workpiece is reduced by the value of the residual deformation $\Delta_{PB}$.

The special feature of the plastic deformation method is that a roll of plastically deformed material RB is formed in front of the smoother, which is more or less spread out as a result of repeated action.

The special feature of the proposed solution according to the invention is that in this case on smoothing the deformed roll of material is not spread out or removed but rather is subjected to sufficient elastic-plastic deformation in a direction perpendicular to the movement of the tool. That is to say that with this solution it is proposed to move away the roll of material arising in front of the smoother in a direction which is perpendicular to the direction of the smoother.

The optimum force of the deforming smoothing is $P_y$=200-300N. With $P_y$=300 N the depth of the reinforced layer increases and the microhardness is increased in the lower layers, although the microhardness in the top thin surface layer falls due to the reduction in plasticity.

Figure 4:
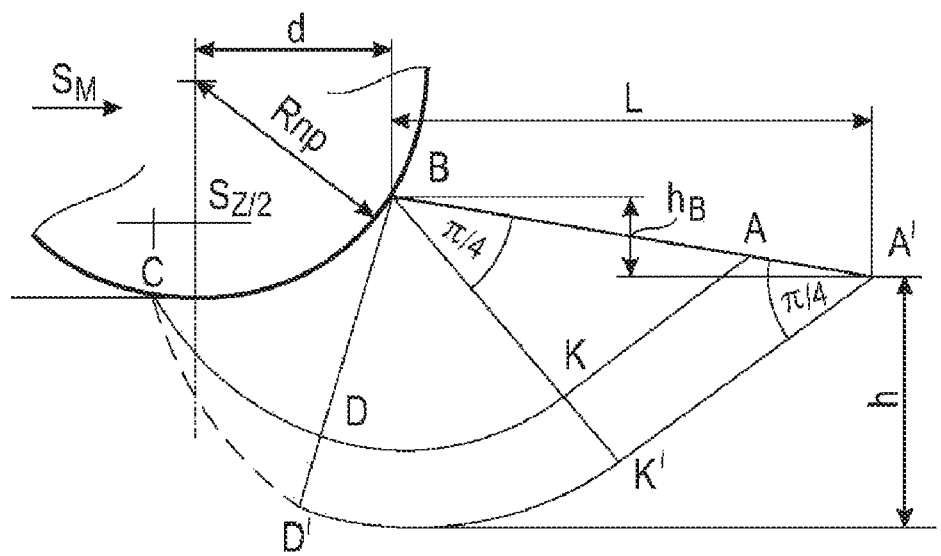
FIG. 4 is a simplified schematic representation of a stress field.

FIG. 4 shows simplified schematic representation of a stress field which arises during plastic deformation with the roller.

Point A' denotes the length L of the frontmost wave BA' outside the contact surface. A'K'D'C' is the boundary of the region of the developed plastic deformations, the lowest point of which denotes the thickness of the reinforcing layer h. The deformation fields located beneath this point do not cause any noteworthy change in the resistance of the metal to the plastic deformations. The lines BK' and K'A' exhibit an angle of $\pi/4$ to BA'. For geometric reasons:

$$h=\sqrt{2}/2(h^2_b+1^2)^{1/2}-h_b \quad (1)$$

For the most frequent mode of processing $l \gg h_B$ $$h \approx 0.7\ L \quad (2)$$

It has been found experimentally that $$L=2.1 d^{0.5} \quad (3)$$

If (3) is used in (2), the yield magnitude for one pass of the deforming tool is obtained.

$$h=1.5 \quad (4)$$

Figure 5:
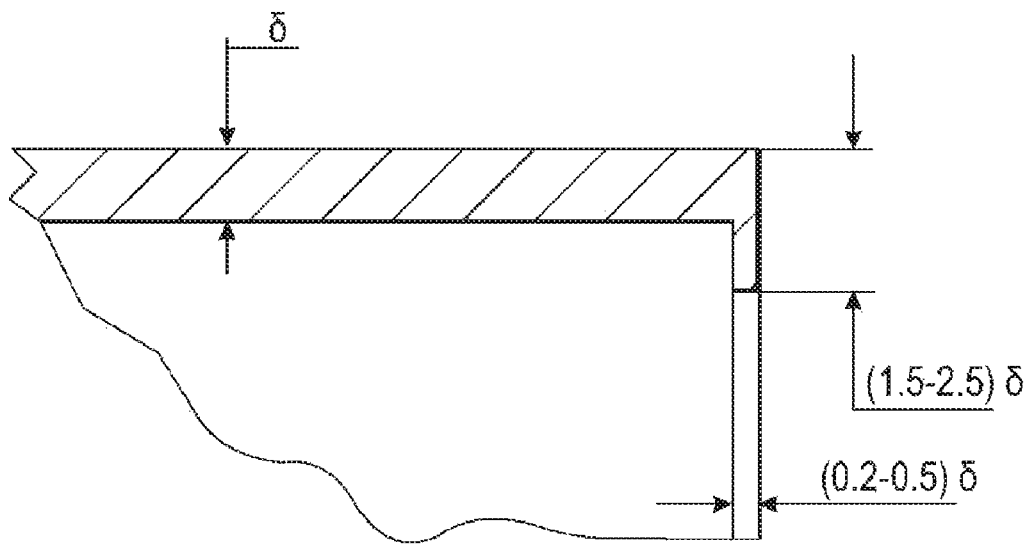
FIG. 5 is a schematic representation of a bead arising at an end edge.

As has already been noted, it is proposed according to the present invention to displace the wave of material which arises on carrying out smoothing of the end face of a workpiece in a direction which is perpendicular to the direction of movement of the smoother, namely in the direction of the inner surface of the part to be welded, which leads to the formation of an annular bead strip, which locally increases the thickness of the wall of the part and increases the local flexural strength of the end face by a multiple, as shown in FIG. 5. Thus, with an inwardly projecting bead height which is equal to 0.5 to 1.5 times the thickness of the wall, the local flexural strength of the end face is increased by 3.37 to 15.625 times.

Formation of the bead with such parameters simplifies technical handling when carrying out the preparatory work for welding.

Figure 6:
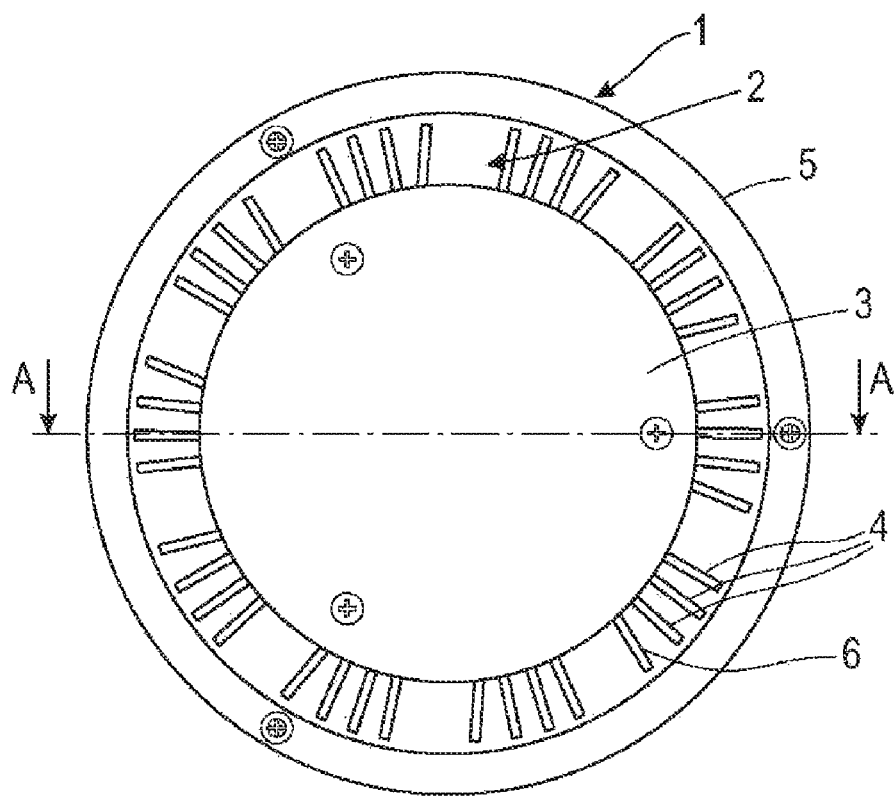
FIG. 6 is a schematic representation of a view from the end face onto a device which is used to form the bead.
Figure 7:
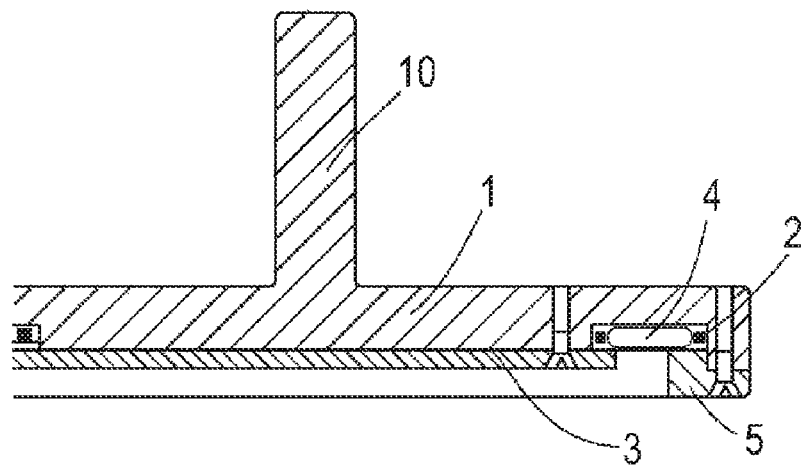
FIG. 7 shows the partial section A-A of FIG. 6.

The structure of the device for producing such a bead is shown in FIG. 6 in a view of the end face and in FIG. 7 as an incomplete section A-A through FIG. 6. It comprises the disc-shaped housing 1 with the holder 10 on its rear end face and with an annular profile rail in the form of a concentric recess on the front thereof, in which an annular separator 2 is arranged, which comprises radially oriented rollers 4 and rollers 6 which are oriented at an acute angle to the radius. The annular separator 2 with the rollers 4, 6 is fastened in the housing 1 by means of a lid 3 in the central part of the housing and by means of a fastening ring 5 on the circumferential part of the housing.

By machining the surfaces of the end faces of the parts to be welded by means of the plastic deformation method using the rollers 4, 6, it is possible to achieve very clean machining. Plastic deformation of the surface to be machined brings about smoothing of the irregularities originally present and the production of a new microrelief on the surface with a substantially lower irregularity height $R_z$.

Formation of a surface layer during deformation smoothing proceeds as a result of the plastic deformation of the surface to be machined. Under the action of a radial force, which acts on the contact surface of the deformation tool with the part, contact pressures arise. If their magnitude exceeds the yield point of the part to be deformed, plastic deformation of its thin layers close to the surface occurs. During plastic deformation the surface layer has a specific fibrous structure (texture) with a crystalline lattice which is distorted relative to the original crystalline lattice.

The device according to FIG. 6 or FIG. 7 functions as follows. By means of the holder 10, the device is arranged in the workbench, which allows clockwise rotary motion about the axis of the annular separator 2 in accordance with the arrow for the device of FIG. 6. The thin-walled metallic jacket to be machined is fed with its end face (not shown) to the deforming rollers 4, 6 of the device and pressed thereagainst with a previously determined force. On rotation of the device relative to its axis, the radially oriented rollers 4 plastically deform the end face of the jacket, and the rollers 6, which are oriented at an acute angle to the radius of the separator 2, e.g. between 35° and 50°, move the material resulting from the plastic deformation to the side of the inner surface of the jacket to be machined and form a bead thereon, which is bent toward the inside of the edge, to be prepared of the jacket. The necessary dimensions of the resultant bead are formed in accordance with the number of revolutions. The cleanness of the surface of the end face to be machined of the jacket then corresponds to the cleanness of the surface of the deforming rollers. For practical reasons, the necessary force applied to the roller may amount to 100 to 200 or even 300 N. Therefore, and on the basis of the requirements for achieving plastic deformation in the material of the jacket to be machined, needle rollers are preferably selected which have a diameter which does not exceed 5 times the thickness of the end face of the jacket blank, and the hardness of the material thereof must amount to HRc>65 and the roughness parameter of the surface to Ra≦0.16 μm. It is convenient to group the radially oriented rollers and the rollers arranged at an angle to the radius in separate sectors arranged along the circumference of the annular separator 2, which sectors symmetrically enclose the entire end face of the jacket to be machined. Each sector is then configured such that it may enclose 5 to 12% of the surface of the end face to be deformed of the blank.

Taking account of the magnitude of the upsetting of the end face h shown in FIG. 4, which arises during a pass of the deforming tool, and on the basis of the similarity of the displaced volume of the material and of the volume of the material in the bead to be formed, the full magnitude of the shrinkage of the end face Δh may be determined with an equation $$\Delta h = a\delta + b\delta^2/R$$

wherein R is the radius of the neutral layer of the blank in mm, a, b are the constant coefficients for the range δ/R=from 0.003 to 0.01, correspondingly equal to 0.1 to 0.3 for a and to 0.075 to 0.375 for b;

δ is the thickness of the original metal blank in mm.

It is known that during welding of jackets or plates a biaxially stressed state of the metal arises in the weld zone.

Figure 8:
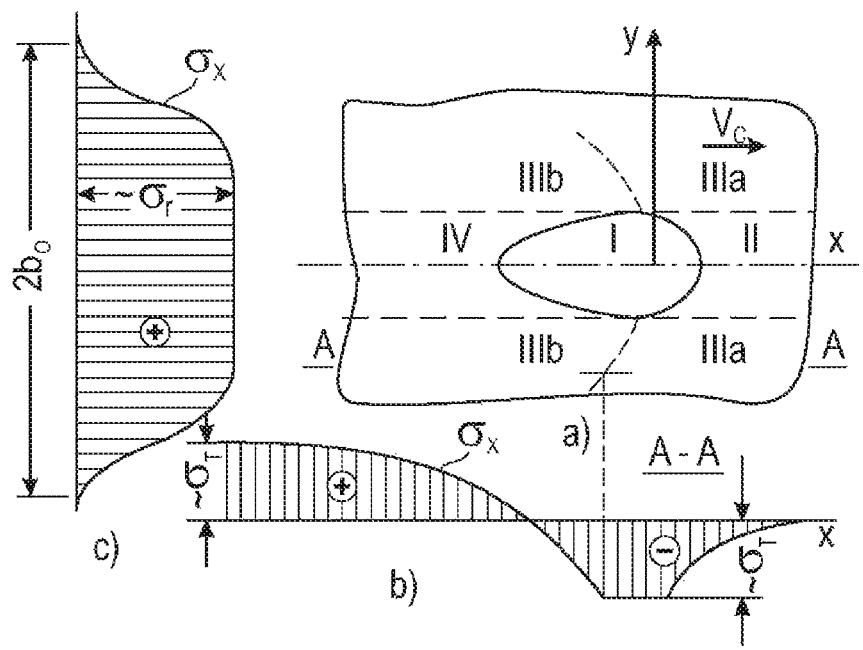
FIG. 8 is a schematic representation of the formation of stresses during full fusion welding of plates in one pass.

A typical distribution pattern for stresses in the metal on movement of the hot heat source is shown in FIG. 8.

The region of the zone II, which adjoins the zone I, is distinguished by the presence of considerable transverse contraction stresses σy. This is where plastic deformation of the metal occurs. In zone III a, which is subjected to heating on movement of the heat source, the contraction stresses σx and σy increase, wherein in the vicinity of zone I the stresses σy are insignificant. The increase in contraction stresses σx in the course of plastic shortening deformation varies at the boundary of the zones III a and III b as a result of a decline in the contraction stresses, and then also as a result of the transition thereof into expansion stresses as the metal cools. At the boundary of zones I and IV, the stresses are close to zero, while in the zone IV σx and σy are expansive. As the source moves away in the zone of the width $2b$ where the plastic deformations have taken place, expansive residual stresses σx arise. In the metal the stresses are close to zero beyond the boundaries of the plastic deformation zone $2b$ where the plate has a large width.

The results of determining the displacements of the edge of the plate on heating by a movable heat source may be used to explain the formation mechanism of transverse shrinkage in the zone of the weld seam.

Figure 9:
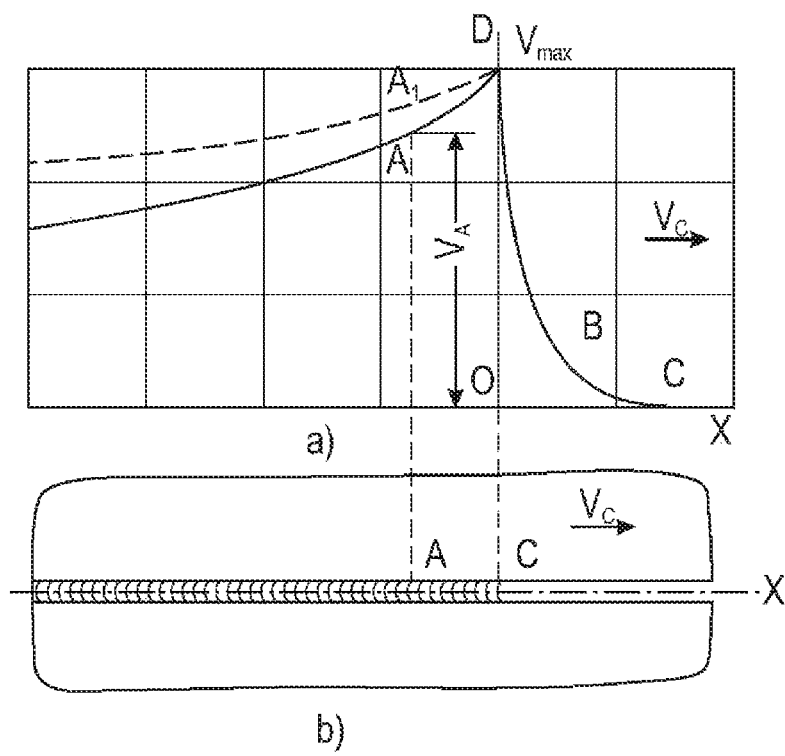
FIG. 9 shows the formation of transverse shrinkage during full fusion welding in one pass.

If two plates are welded with a gap, as shown in FIG. 9b, the edges of each of the plates are subjected to transverse displacement v. Upstream of the heat source, there is nothing to hinder the displacement of the edges toward one another. At the moment of welding of the edges the displacement reaches its maximum magnitude vmax, while the edges move closer together by 2 vmax. If the metal were to adopt elevated strength after welding, when it is at an elevated temperature, the reduction v downstream of the heat source would lead immediately to stretching of the plates toward one another and the occurrence of transverse shrinkage of 2vmax. In actual fact, the metal in the portion OA achieves low resistance to plastic deformation, which results in the metal flowing in this portion and being extended by the value 2(vmax−vA).

At point A the plastic extension of the metal in the direction transverse to the weld seam stops; the edges move together by 2 vA. After complete cooling of the metal, transverse shrinkage Atransv=2 vA then develops. The magnitude of the plastic deformation, i.e. the difference 2(vmax−vA), depends mainly on the mechanical properties of the metal and on heat release into the air. The greater the heat release, the more rapidly the curve v shown in FIG. 9a declines downstream of the source. The decline in v does not in this respect correspond to the decline in the temperature of the metal. Therefore, with a gradual decline in v, corresponding to the dashed curve in FIG. 9a, the magnitude 2 vA increases, and plastic deformation falls.

In the case of plates which are full fusion welded without a gap, the edges cannot move unimpeded upstream of the heat source. Up to a specific point B, which is shown in FIG. 9a, elastic compression of the metal takes place by the edges bearing on one another. Upsetting plastic deformation of the metal proceeds from point B to point D. Here the portion CB, which is subjected to elastic deformation, acts at the point D on the magnitude Vmax due to the elastic interaction of the portions of the metal BC and BD. This has the effect that, in the case of welding plates without a gap and in the case of thorough fusion of the entire continuous plate, the magnitude 2 vmax is smaller and consequently the transverse shrinkage, which is equal to 2 vA, is also smaller. Transverse shrinkage is in this case less by 15 to 20% than on the case of welding with a gap. In the case of an ideal elastic profile of the full fusion welding process involving two plates, the maximum possible magnitude 2 vmax is expressed by the formula:

$$2v_{max}=2(a/c\gamma)(q/\delta v_c)$$

The actual magnitude of the transverse shrinkage, which arises at the moment of welding and continues after complete cooling of the plate, is less than is theoretically possible.

The following applies when carrying out single run arc seam welding of plates, where they are joined together without a gap:

$$\Delta_{non}(0.5\delta o 0.7)2v_{max}=[(1.0\ to\ 1.4)\alpha/c\lambda](q/\delta v_c)$$

The formula applies for low-carbon, low-alloy and austenitic steels and also for titanium and aluminum alloys with a thickness of up to approximately 16 mm.

Transverse shrinkage of the full fusion welded plates is not observed immediately after welding, but instead only cooling of the plates is complete, although the edges do move together directly during the welding process.

On passage of the heat source, a comparatively narrow zone of the metal is affected by the displacement, namely that heated to a high temperature. Fastening of the plates therefore has virtually no influence on the transverse movement of the edges during welding. Only in the cooling phase, when fastening is sufficiently strong, is plastic deformation of the metal possible, leading to a reduction in transverse shrinkage. At the initial portions of the seam, no quasi-stationary displacement of the edges is achieved, and the transverse shrinkage is here somewhat smaller in height than over the remaining part of the seam.

Figure 10:
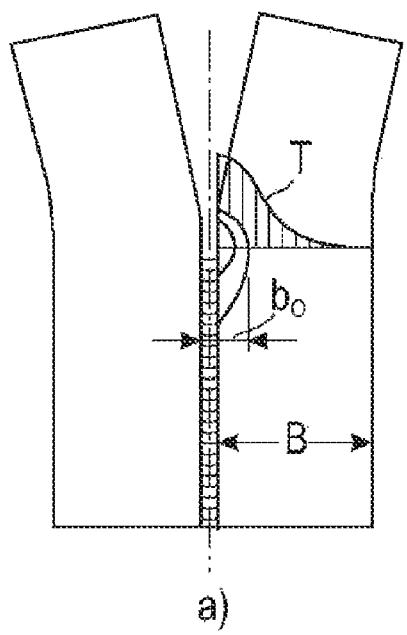
FIGS. 10 and 11 show deformation in the plane during welding of long and thin plates.
Figure 11:
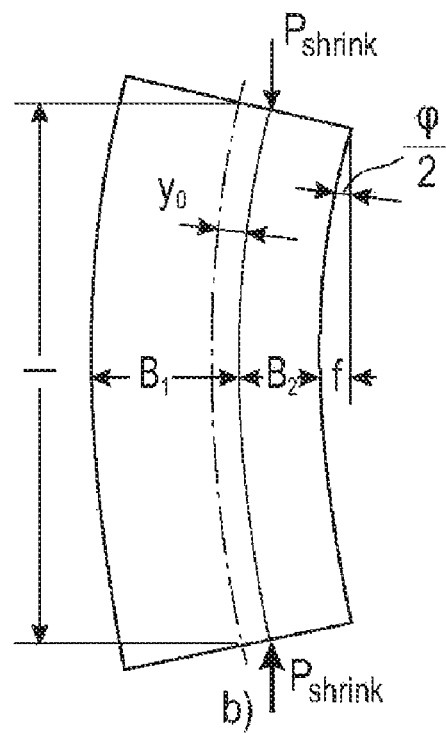

On repeated heating at one and the same location, the transverse shrinkage undergone by the second seam is equal to the shrinkage undergone by the first seam, if the heating conditions are not changed. If the plates are welded with a gap, it may so happen that even before the heat source is supplied the edges may move toward or away from one another due to temporary deformation. In this case the total transverse shrinkage consists of displacements which arise due to the temporary deformation of the plates, and of displacements in the weld zone. In the case of welding plates joined together without a gap, or those which are joined together with clips, the transverse shrinkage does not as a rule depend on temporary deformation. An exception may be found where for example parts joined together without a gap but not fastened to one another move apart during the welding process. The plates may move away from one another and a gap may open up during welding for two reasons: "temporary" structural deformation and uneven widthwise heating of narrow plates. Deformation of narrow plates by uneven widthwise heating is by nature flexural deformation in the longitudinal direction in a plane, as shown schematically in FIG. 10. Flexure of the plates takes place as a result of the fact that the heated side of the plate expands, while the cold side works against this expansion. To the extent that the width of the plate reduces at a constant heat source power, the deformations caused by rotation of the sections grow. However, very narrow plates may be heated fully to high temperatures and do not suffer any significant angular deformations.

The width of the plates, at which the deformations caused by rotation of the sections may be disregarded, depends on the type of welding and the thermophysical characteristics of the metal. For an objective assessment of the width of the plates, the relationship $B/b_0$ must be used, wherein B is the width of a plate and $b_0$ the width of the zone which is heated to a temperature at which the yield point of the metal is close to zero.

Assuming strong, rapidly moving heat sources, the value $b_0$ may be calculated according to the formula:

$$b_o = (0.242/c\gamma T_o)(1/v_c\delta)$$

In the case of a relationship $B/b0 \geqq 8$ the plates may be regarded as wide, and the angular deformations caused by the uneven heating may be regarded as insignificant.

The residual shortening deformations in the longitudinal direction are determined according to the following formula in the case of full fusion welding of plates, if no flexural deformations have occurred during the welding process:

$$\Delta_{long} = P_{shrink}^1/EF$$

wherein $P_{shrink} = 1.7/v_c$ is the shrinkage force, and I and F are the length and cross-sectional area of the plate to be welded.

When welding two plates of different widths, the shrinkage force $P_{shrink}$ which is arranged at a distance y0 from the center axis, produces the bending moment M as shown in FIG. 9b. The plates to be welded also bend after cooling in addition to the lengthwise shortening $$\Delta_{long} = P_{shrink}/E(B1+B2)\delta$$

The above-stated relationships and dependencies make it possible to select the optimum dimensions of the fusion zone and the minimum length over which heat removal from the fusion zone must take place, and to determine the optimum dimensions of the length over which the parts must be enclosed to prevent bulging during welding and to reduce the residual stresses in the structure to be welded.

According to the present invention, the stated object of selecting the optimum parameters for the welding process are achieved in that the mutually centered jackets to be joined together are welded together temporarily at their circumference in the joint plane by spot welding with previously determined stepwise movement of the electrode at a spacing of 20 to 50δ, while the actual continuous main welding proceeds with the formation of a fusion zone to width of which amounts to 4 to 6δ.

The object is also achieved in that, when carrying out the welding method, heat removal begins in the parts to be welded at a distance from the joint plane of the thin-walled jacket parts which amounts to no more than 5 to 8δ.

The technical result of the invention is achieved within the boundaries of the stated relationships, which were determined experimentally.

The method according to the invention is performed as follows.

First of all, using the deformation devices on the jacket blanks, deformation of the microprojections on the surface to be welded of the end faces is undertaken, with shrinkage thereof to a magnitude of Δh, and the roughness parameter of the end faces of Ra≦0.16 μm is achieved. Using these deformation devices, the metal to be deformed at the end faces of the blanks is displaced toward the side of the inner surface, and inner annular strips are formed on these end faces, the width of which amounts to from 0.5 to 1.5δ and the thickness of which amounts to from 0.2 to 0.5δ.

The jackets to be joined are arranged in the device which effects centering in accordance with the external diameter. The centering device structure here comprises cooling elements for dissipating the heat from the parts to be welded. After arranging the jacket blanks in the centering device and checking the congruence concentricity of their end faces at the circumference, the spot weld seam is brought about in the joint plane by stepwise movement of the electrode in steps of 20 to 50δ. After local welding of the jacket blanks, continuous actual main welding is performed with the formation of a fusion zone whose width is between 4 and 6δ. Then heat removal begins in the parts to be welded in a direction perpendicular to the seam, over a length which amounts to no more than 6 to 8δ from the plane of symmetry of the joint passing through the joint line. The spot welding and main welding cycle may be performed automatically, i.e. in programmed manner by an automatic welder.

To carry out the technical solution according to the invention, models of the weld jackets were made of stainless steel of grade 08X18H10T with a thickness of 0.5 mm and a diameter of 147 and 213 mm. The models of the weld joint tubes were obtained by pulsed-arc welding using a non-consumable electrode in a medium consisting of argon, nitrogen and hydrogen. Welding took place using a TIG welding head. The results achieved confirmed the technical and economic effectiveness of the solution according to the invention.

Use of the device according to the invention offers a real possibility of achieving welding structures of the closed container type in the form of thin-walled closed liner jackets. Manufacture and testing of these thin-walled liner jackets, which were produced using the method according to the invention, confirmed their high reliability and effectiveness.

INDUSTRIAL APPLICABILITY

The invention may be used in aerospace engineering and chemical engineering in the production of containers of corrosion-resistant steels, aluminum alloys and other materials. Moreover, the invention may be used in the production of pressure vessels and pipes for the construction industry, for the storage and transport of liquid and gaseous media.

The invention claimed is:

1. A method of joining thin-walled jackets by fusion welding, the method comprising the steps of sequentially:
   preparing end faces of the jackets by plastically deforming and upsetting microprojections thereon and thereby forming the metal of the upset microprojections into annular beads on inner surfaces of the respective jackets,
   abutting the inner surfaces of the end faces including the annular beads while centering the jackets on each other relative to their external diameters,
   spot welding the end faces together in a plane where the end faces abut,
   joining the spot-welded end faces with a continuous main weld having a width equal to between 4δ and 6δ, δ being the thickness in mm of the wall of the jacket, and
   extracting heat from the welded jackets starting at a distance not exceeding 8δ from a joint center line where the end faces abut.

2. The method according to claim 1, wherein heat extraction starts in the jackets at a distance not exceeding 6δ from the joint center line.

3. The method according to claim 1, wherein deformation of the microprojections on the surface of the end face is effected by upsetting of the magnitude $\Delta h = a\delta + b\delta^2/R$ with rollers with a roughness parameter Ra≦0.16 μm, R being the radius of the jacket in mm and the coefficients a, b being constant coefficients with validity for the range δ/R of 0.003 to 0.01, a lying between 0.1 and 0.3 and b between 0.075 and 0.375.

4. The method according to claim 1, wherein the inner annular bead is formed with a ring width of from 0.5δ to 1.5δ and a ring thickness of 0.2δ and 0.5δ.

5. The method according to claim 1, wherein the spot welding takes is effected by stepwise movement of an electrode by a step of from 20δ to 50δ.

6. The method according to claim 1, wherein deformation and upsetting of the microprojections at the end faces is performed with limitation of radial deformations of outer side surfaces adjoining the end faces of the thin-walled jackets.

7. The method according to claim 1, wherein deformation and upsetting of the microprojections at the end faces is performed with simultaneous smoothing by rollers of lateral surfaces externally adjoining the end faces of the thin-walled jackets.

8. The method according to claim 1, wherein deformation of the microprojections at the end faces is performed by rollers with a diameter of between 4 and 6δ and with a hardness parameter of HRc>65.

9. The method according to claim 8, wherein deformation of the microprojections of the end faces is performed with a contact force applied to the roller of 200-300 N.

10. The method according to claim 1, wherein spot welding is performed in first and second revolutions, the spot welds of the second revolution being staggered between the spot welds formed during the first revolution.

11. The method according to claim 1, wherein thin-walled annular strips at the inner surfaces of the jackets have the same internal diameter for each of the jackets.

12. The method according to claim 1, further comprising the step of:
   supplying an inert gas media to outer and inner surfaces of the jackets at the end faces as they are welded together.

13. The method according to claim 1, further comprising the step prior to spot welding and after deformation of the microprojections of
   cleaning the end faces of the jackets with solvent welding.

* * * * *